United States Patent
Cudzilo (10) Patent No.: US 9,959,495 B2
(45) Date of Patent: *May 1, 2018

(54) PORTABLE DATA TERMINAL

(71) Applicant: Hand Held Products, Inc., Fort Mill, SC (US)

(72) Inventor: Dennis Henry Cudzilo, Camillus, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/372,743

(22) Filed: Dec. 8, 2016

(65) Prior Publication Data

US 2017/0091608 A1 Mar. 30, 2017

Related U.S. Application Data

(63) Continuation of application No. 12/483,470, filed on Jun. 12, 2009, now Pat. No. 9,519,814.

(51) Int. Cl.
*G06K 7/00* (2006.01)
*G06K 7/10* (2006.01)
*G06K 19/07* (2006.01)

(52) U.S. Cl.
CPC ....... *G06K 19/0728* (2013.01); *G06K 7/0008* (2013.01); *G06K 7/109* (2013.01); *G06K 7/10386* (2013.01)

(58) Field of Classification Search
CPC ........ G06K 7/00; G06K 7/10; G06K 7/10405; G06K 7/10366; G06K 7/10386; G06K 7/10544; G06K 7/10821
See application file for complete search history.

(56) References Cited

U.S. PATENT DOCUMENTS

| 2,524,651 A | 10/1950 | Cooley |
| 2,949,071 A | 8/1960 | Foures |
| 3,561,432 A | 2/1971 | Yamaki et al. |

(Continued)

FOREIGN PATENT DOCUMENTS

| CN | 1719457 A | 1/2006 |
| DE | 10305384 | 8/2004 |

(Continued)

OTHER PUBLICATIONS

Related U.S. Appl. No. 12/889,764, filed Sep. 24, 2010.

(Continued)

*Primary Examiner* — Thien M Le
*Assistant Examiner* — April Taylor
(74) *Attorney, Agent, or Firm* — Additon, Higgins & Pendleton, P.A.

(57) ABSTRACT

A portable data terminal that includes a housing and an environmentally responsive device for collecting data about the environment surrounding the housing. The portable data terminal also includes an encoded information reader unit with one or more data collection hardware devices, which can capture data encoded in decodable indicia, e.g., bar codes. In one embodiment, the portable data terminal is configured to operate in a mode that processes the decodable indicia, and the environmental data so as to correlate the information decoded in the decodable indicia with the environmental data.

23 Claims, 3 Drawing Sheets

(56) References Cited

U.S. PATENT DOCUMENTS

| | | |
|---|---|---|
| 4,042,823 A | 8/1977 | Decker et al. |
| 4,078,864 A | 3/1978 | Howell |
| 4,139,822 A | 2/1979 | Urich et al. |
| 4,253,447 A | 3/1981 | Moore et al. |
| 4,271,344 A | 6/1981 | Horiuchi et al. |
| 4,298,312 A | 11/1981 | MacKenzie et al. |
| 4,341,992 A | 7/1982 | Goldstein |
| RE31,289 E | 6/1983 | Moore et al. |
| 4,557,598 A | 12/1985 | Ono et al. |
| 4,573,450 A | 3/1986 | Arakawa |
| 4,576,147 A | 3/1986 | Hashiguchi |
| 4,588,294 A | 5/1986 | Siegmund |
| 4,621,286 A | 11/1986 | Reitmeier et al. |
| 4,621,618 A | 11/1986 | Omagari |
| 4,651,201 A | 3/1987 | Schoolman |
| 4,656,508 A | 4/1987 | Yokota |
| 4,659,195 A | 4/1987 | D'Amelio et al. |
| 4,667,656 A | 5/1987 | Yabe |
| 4,700,693 A | 10/1987 | Lia et al. |
| 4,727,859 A | 3/1988 | Lia |
| 4,733,937 A | 3/1988 | Lia et al. |
| 4,735,501 A | 4/1988 | Ginsburgh et al. |
| 4,787,369 A | 11/1988 | Allred, III et al. |
| 4,790,294 A | 12/1988 | Allred, III et al. |
| 4,794,912 A | 1/1989 | Lia |
| 4,796,607 A | 1/1989 | Allred, III et al. |
| 4,827,909 A | 5/1989 | Kato et al. |
| 4,857,716 A | 8/1989 | Gombrich et al. |
| 4,862,253 A | 8/1989 | English et al. |
| 4,862,873 A | 9/1989 | Yajima et al. |
| 4,887,154 A | 12/1989 | Wawro et al. |
| 4,909,600 A | 3/1990 | Ciarlei et al. |
| 4,913,369 A | 4/1990 | Lia et al. |
| 4,926,257 A | 5/1990 | Miyazaki |
| 4,941,454 A | 7/1990 | Wood et al. |
| 4,941,456 A | 7/1990 | Wood et al. |
| 4,962,751 A | 10/1990 | Krauter |
| 4,979,498 A | 12/1990 | Oneda et al. |
| 4,980,763 A | 12/1990 | Lia |
| 4,989,581 A | 2/1991 | Tamburrino et al. |
| 4,998,182 A | 3/1991 | Krauter et al. |
| 5,010,876 A | 4/1991 | Henley et al. |
| 5,014,515 A | 5/1991 | Krauter |
| 5,014,600 A | 5/1991 | Krauter et al. |
| 5,018,436 A | 5/1991 | Evangelista et al. |
| 5,018,506 A | 5/1991 | Danna et al. |
| 5,019,121 A | 5/1991 | Krauter |
| 5,045,935 A | 9/1991 | Kikuchi |
| 5,047,848 A | 9/1991 | Krauter |
| 5,052,803 A | 10/1991 | Krauter |
| 5,061,995 A | 10/1991 | Lia et al. |
| 5,066,122 A | 11/1991 | Krauter |
| 5,070,401 A | 12/1991 | Salvati et al. |
| 5,114,636 A | 5/1992 | Evangelista et al. |
| 5,140,319 A | 8/1992 | Riordan |
| 5,140,975 A | 8/1992 | Krauter |
| 5,191,879 A | 3/1993 | Krauter |
| 5,202,758 A | 4/1993 | Tamburrino |
| 5,203,319 A | 4/1993 | Danna et al. |
| 5,222,477 A | 6/1993 | Lia |
| 5,275,152 A | 1/1994 | Krauter et al. |
| 5,278,642 A | 1/1994 | Danna et al. |
| 5,314,070 A | 5/1994 | Ciarlei |
| 5,323,899 A | 6/1994 | Strom et al. |
| 5,335,662 A | 8/1994 | Kimura et al. |
| 5,347,989 A | 9/1994 | Monroe et al. |
| 5,356,339 A | 10/1994 | Bochot et al. |
| 5,365,331 A | 11/1994 | Tamburrino et al. |
| 5,373,317 A | 12/1994 | Salvati et al. |
| D358,417 S | 5/1995 | Medin et al. |
| 5,435,296 A | 7/1995 | Vivenzio et al. |
| 5,633,675 A | 5/1997 | Danna et al. |
| 5,701,155 A | 12/1997 | Wood et al. |
| 5,734,418 A | 3/1998 | Danna |
| 5,751,341 A | 5/1998 | Chaleki et al. |
| 5,754,313 A | 5/1998 | Pelchy et al. |
| 5,857,963 A | 1/1999 | Pelchy et al. |
| 5,895,350 A | 4/1999 | Hori |
| 5,911,036 A | 6/1999 | Wright et al. |
| 5,941,808 A | 8/1999 | Oder |
| 5,966,168 A | 10/1999 | Miyazaki |
| 5,989,185 A | 11/1999 | Miyazaki |
| 6,031,454 A | 2/2000 | Lovejoy et al. |
| 6,066,090 A | 5/2000 | Yoon |
| 6,083,152 A | 7/2000 | Strong |
| 6,097,848 A | 8/2000 | Salvati |
| 6,139,490 A | 10/2000 | Breidenthal et al. |
| 6,221,007 B1 | 4/2001 | Green |
| 6,432,046 B1 | 8/2002 | Yarush et al. |
| 6,468,201 B1 | 10/2002 | Burdick |
| 6,471,642 B1 | 10/2002 | Igarashi |
| 6,483,535 B1 | 11/2002 | Tamburrino et al. |
| 6,487,479 B1 | 11/2002 | Nelson |
| 6,494,739 B1 | 12/2002 | Vivenzio et al. |
| 6,538,732 B1 | 3/2003 | Drost et al. |
| D473,306 S | 4/2003 | Motoki et al. |
| 6,590,470 B1 | 7/2003 | Burdick |
| 6,614,872 B2 | 9/2003 | Bueno et al. |
| 6,668,272 B1 | 12/2003 | Keller et al. |
| 6,697,794 B1 | 2/2004 | Milby |
| 6,697,805 B1 | 2/2004 | Choquier et al. |
| 6,746,164 B1 | 6/2004 | Albright et al. |
| 6,758,403 B1 | 7/2004 | Keys et al. |
| 6,763,175 B1 | 7/2004 | Trottier et al. |
| 6,764,009 B2 | 7/2004 | Melick et al. |
| 6,772,098 B1 | 8/2004 | Stark et al. |
| 6,772,947 B2 | 8/2004 | Shaw |
| 6,830,545 B2 | 12/2004 | Bendall |
| 6,834,807 B2 | 12/2004 | Ehrhart et al. |
| 6,851,610 B2 | 2/2005 | Knowles et al. |
| 6,908,034 B2 | 6/2005 | Alleshouse |
| 6,942,151 B2 | 9/2005 | Ehrhart |
| 6,950,829 B2 | 9/2005 | Schlabach et al. |
| 6,953,432 B2 | 10/2005 | Schiefer |
| 6,982,765 B2 | 1/2006 | Testin et al. |
| 7,092,009 B2 | 8/2006 | Patel et al. |
| 7,104,453 B1 | 9/2006 | Xiaoxun et al. |
| 7,111,787 B2 | 9/2006 | Ehrhart |
| 7,121,469 B2 | 10/2006 | Dorai et al. |
| 7,134,993 B2 | 11/2006 | Lia et al. |
| 7,137,556 B1 | 11/2006 | Bonner et al. |
| 7,301,439 B2 | 11/2007 | Hashimoto et al. |
| 7,321,673 B2 | 1/2008 | Watai et al. |
| 7,346,221 B2 | 3/2008 | Chanas et al. |
| 7,434,226 B2 | 10/2008 | Singh |
| 7,434,724 B2 | 10/2008 | Lane |
| 7,461,972 B2 | 12/2008 | Cohen |
| 7,526,812 B2 | 4/2009 | DeYoung |
| 7,543,748 B2 | 6/2009 | Kiliccote |
| 7,571,857 B2 | 8/2009 | Payne et al. |
| 7,571,859 B2 | 8/2009 | Knowles et al. |
| 7,577,516 B2 | 8/2009 | Dobeck et al. |
| 7,685,428 B2 | 3/2010 | Piersol |
| 7,712,670 B2 | 5/2010 | Sauerwein et al. |
| 7,734,093 B2 | 6/2010 | Wolff et al. |
| 7,779,355 B1 | 8/2010 | Erol et al. |
| 7,782,586 B2 | 8/2010 | Soleimani et al. |
| 7,853,766 B2 | 12/2010 | Lindner et al. |
| 7,970,738 B2 | 6/2011 | Wolff et al. |
| 8,014,665 B2 | 9/2011 | Clifton et al. |
| 8,043,156 B2 | 10/2011 | Ackley et al. |
| 8,073,795 B2 | 12/2011 | Honisch |
| 8,090,462 B2 | 1/2012 | Wininger et al. |
| 8,270,303 B2 | 9/2012 | Sauerwein et al. |
| 2001/0032202 A1 | 10/2001 | Seese et al. |
| 2002/0093633 A1 | 7/2002 | Milch |
| 2002/0128790 A1 | 9/2002 | Woodmansee |
| 2002/0172498 A1 | 11/2002 | Esenyan et al. |
| 2003/0004397 A1 | 1/2003 | Kameya et al. |
| 2003/0097042 A1 | 5/2003 | Eino |
| 2003/0105565 A1 | 6/2003 | Loda et al. |
| 2003/0128400 A1 | 7/2003 | Watai et al. |
| 2003/0154133 A1 | 8/2003 | Furon et al. |
| 2004/0017300 A1 | 1/2004 | Kotzin et al. |

(56) References Cited

U.S. PATENT DOCUMENTS

| | | |
|---|---|---|
| 2004/0064323 A1 | 4/2004 | Kemper et al. |
| 2004/0096123 A1 | 5/2004 | Shih et al. |
| 2004/0183900 A1 | 9/2004 | Karpen et al. |
| 2004/0193016 A1 | 9/2004 | Root et al. |
| 2004/0198631 A1 | 10/2004 | Hellberg |
| 2004/0215413 A1 | 10/2004 | Weldum et al. |
| 2004/0223649 A1 | 11/2004 | Zacks et al. |
| 2004/0225185 A1 | 11/2004 | Obata et al. |
| 2005/0015480 A1 | 1/2005 | Foran |
| 2005/0041097 A1 | 2/2005 | Bernstein et al. |
| 2005/0050707 A1 | 3/2005 | Scott et al. |
| 2005/0129108 A1 | 6/2005 | Bendall et al. |
| 2005/0162643 A1 | 7/2005 | Karpen |
| 2005/0187739 A1 | 8/2005 | Baust et al. |
| 2005/0219263 A1 | 10/2005 | Thompson et al. |
| 2005/0237557 A1 | 10/2005 | Ferlitsch |
| 2005/0258246 A1 | 11/2005 | Wolff et al. |
| 2005/0259289 A1 | 11/2005 | Ferlitsch et al. |
| 2005/0281520 A1 | 12/2005 | Kehoskie et al. |
| 2005/0286453 A1 | 12/2005 | Matsumoto |
| 2006/0006987 A1 | 1/2006 | Hashimoto et al. |
| 2006/0015919 A1 | 1/2006 | Karppinen et al. |
| 2006/0038572 A1 | 2/2006 | Philbrook |
| 2006/0049250 A1 | 3/2006 | Sullivan |
| 2006/0050983 A1 | 3/2006 | Bendall et al. |
| 2006/0053088 A1 | 3/2006 | Ali et al. |
| 2006/0072903 A1 | 4/2006 | Weldum et al. |
| 2006/0124744 A1 | 6/2006 | Gormish et al. |
| 2006/0196950 A1 | 9/2006 | Kiliccote |
| 2006/0202821 A1 | 9/2006 | Cohen |
| 2006/0206245 A1 | 9/2006 | Camper et al. |
| 2006/0263789 A1 | 11/2006 | Kincaid |
| 2006/0265590 A1 | 11/2006 | DeYoung et al. |
| 2007/0033109 A1 | 2/2007 | Patten et al. |
| 2007/0047816 A1 | 3/2007 | Graham et al. |
| 2007/0106536 A1 | 5/2007 | Moore |
| 2007/0106754 A1 | 5/2007 | Moore |
| 2007/0124278 A1 | 5/2007 | Lew, Jr. et al. |
| 2007/0176000 A1 | 8/2007 | Cattrone et al. |
| 2007/0177824 A1 | 8/2007 | Cattrone et al. |
| 2007/0182829 A1 | 8/2007 | Zacks et al. |
| 2007/0226321 A1 | 9/2007 | Bengtson |
| 2007/0273774 A1 | 11/2007 | Holmes |
| 2008/0027983 A1 | 1/2008 | Erol et al. |
| 2008/0039206 A1 | 2/2008 | Ackley et al. |
| 2008/0052205 A1 | 2/2008 | Dolley et al. |
| 2008/0071143 A1 | 3/2008 | Gattani et al. |
| 2008/0133295 A1 | 6/2008 | Cappel et al. |
| 2008/0144116 A1 | 6/2008 | Pauly et al. |
| 2008/0163364 A1 | 7/2008 | Ferlitsch |
| 2008/0170775 A1 | 7/2008 | Pasupuleti et al. |
| 2008/0183852 A1 | 7/2008 | Pramer et al. |
| 2008/0185432 A1 | 8/2008 | Caballero et al. |
| 2008/0217409 A1* | 9/2008 | Ito .................. G06K 7/0004 235/440 |
| 2008/0247629 A1 | 10/2008 | Gilder et al. |
| 2008/0272585 A1 | 11/2008 | Conard et al. |
| 2008/0314969 A1 | 12/2008 | Hussey |
| 2009/0184165 A1 | 7/2009 | Bertness et al. |
| 2009/0218262 A1 | 9/2009 | Bowers et al. |
| 2009/0238626 A1 | 9/2009 | Ming et al. |
| 2009/0292930 A1 | 11/2009 | Marano et al. |
| 2010/0065636 A1 | 3/2010 | Byun et al. |
| 2010/0071003 A1 | 3/2010 | Bychkov et al. |
| 2010/0076976 A1 | 3/2010 | Sotirov et al. |
| 2010/0088123 A1 | 4/2010 | McCall et al. |
| 2010/0075292 A1 | 5/2010 | DeYoung et al. |
| 2010/0155479 A1 | 6/2010 | Ming |
| 2010/0157318 A1 | 6/2010 | Ming |
| 2010/0163624 A1 | 7/2010 | Hosoi et al. |
| 2010/0177212 A1 | 7/2010 | Holmes |
| 2010/0179857 A1 | 7/2010 | Kalaboukis et al. |
| 2010/0228387 A1 | 9/2010 | Bowers et al. |
| 2010/0295665 A1* | 11/2010 | Landau ............. G06Q 10/087 340/10.42 |
| 2011/0058187 A1 | 3/2011 | Smith et al. |
| 2011/0066281 A1 | 3/2011 | Ksiazek |
| 2011/0079639 A1 | 4/2011 | Khan |
| 2011/0107370 A1 | 5/2011 | Cassanova et al. |
| 2011/0121066 A1 | 5/2011 | Tian et al. |
| 2011/0282942 A1 | 11/2011 | Berger et al. |
| 2014/0055244 A1* | 2/2014 | Burchell ............... G01K 1/024 340/10.1 |

FOREIGN PATENT DOCUMENTS

| | | |
|---|---|---|
| EP | 1447770 | 8/2004 |
| EP | 1892648 A2 | 2/2008 |
| JP | 2000076504 A | 3/2000 |
| JP | 2003-149045 A | 5/2003 |
| JP | 2004243516 | 9/2004 |
| WO | 2005015144 A1 | 2/2005 |
| WO | 2005/024744 A1 | 3/2005 |
| WO | 2005020577 A1 | 3/2005 |
| WO | 20050124594 | 12/2005 |
| WO | 20090260591 A1 | 2/2009 |

OTHER PUBLICATIONS

Office Action in related European Application No. 15170879.9 dated Feb. 28, 2017, pp. 1-6.
Extended Search Report in counterpart European Application No. 16192455.0 dated Feb. 1, 2017, pp. 1-13.
First Office Action and Search Report in Chinese Counterpart Application 201010241866.3 including English Translation, 23 pages [Previously provided in Parent Application].
European Office Action, dated Oct. 31, 2014, in Application 10 165 710.4-1811, 8 pages. [Previously provided in Parent Application].
Second Chinese Office Action for Application No. 20101024186.3, dated Sep. 9, 2014, English Translation provided. [Previously provided in Parent Application].
Exam Report in related European Application No. 10165710.4 dated Oct. 10, 2015, 8 pages, [Previously provided in Parent Application].
Extended European Search Report in counterpart European Application No. 15170879.9 dated Sep. 14, 2015, pp. 1-9 [Previously provided in Parent Application].
Third Chinese Office Action in related Application No. 201010241866.3, English translation included, dated Mar. 16, 2015, 8 pages.[Previously provided in Parent Application].
Office Action in related European Application No. 15170879.9 dated Aug. 1, 2017, pp. 1-9.

* cited by examiner

PORTABLE DATA TERMINAL

CROSS-REFERENCE TO RELATED APPLICATION

The present application claims the benefit of U.S. patent application Ser. No. 12/483,470 for a Portable Data Terminal filed Jun. 12, 2009 (and published Dec. 16, 2010 as U.S. Patent Publication No. 2010/0314443), now U.S. Pat. No. 9,519,814. Each of the foregoing patent application, patent publication, and patent is hereby incorporated by reference in its entirety.

FIELD OF THE INVENTION

The present invention is related to devices for decoding decodable indicia, and more particularly, to portable data terminals that correlate environmental data with other data collected by the portable data terminal.

BACKGROUND OF THE INVENTION

Portable data terminals that are equipped with hardware for reading decodable indicia are available in multiple varieties. Many of these are further configured with additional features, functions, and devices, all of which are combined into a single terminal that is operatively configured to collect, transmit, and receive different types of data. For example, there are many portable data terminals that can collect data using bar code scanning and imaging hardware, magnetic stripe reading hardware, and radio frequency identification tag ("RFID") reading hardware, among many others. While such hardware permits a wide range of configurations and functionality for the portable data terminal, this hardware is often not equipped to collect data and information about the environment in the immediate vicinity of the terminal device. However, this data can be useful, and particularly beneficial if it can be correlated to the data encoded in one or more of the decodable indicia, or other data that is collected and processed by the hardware that is already incorporated into the portable data terminal.

There is therefore a need for a portable data terminal that is configured to measure, collect, and store data about the environment. It is likewise desirable that such a portable data terminal is configured to process the stored data so as to correlate the environmental data with the other data, e.g., a bar code, and/or an image.

SUMMARY OF THE INVENTION

There is provided embodiments of a portable data terminal that comprise an environmental sensing device with a sensing portion exposed to, or with access to the environment in surrounding relation to the portable data terminal device. Such embodiments are configured to operate in a manner so that the device can collect the environmental data, store the environmental data, and correlate the environmental data with other data, such as, for example, data that is stored in decodable indicia, which are decoded by, e.g., a bar code reading device.

For purposes of example only, in one embodiment, a portable data terminal having a housing in surrounding relation to one or more components for reading a decodable indicia, the portable data terminal comprising a memory, a control circuit communicatively coupled to the memory, an encoded information reader unit responsive to a signal from the control circuit, the encoded information reader unit comprising a data collection hardware device selected from one of a bar code reading device, an RFID reading device, and a card reading device, an interface bus communicatively coupled to one or more of the memory, control circuit, and the encoded information reader unit, and an environmentally responsive device coupled to the interface bus, the environmentally responsive device comprising a sensing portion in communication with an environment external to the housing in a manner capturing an environmental reading for the environment.

In another embodiment, a hand held reader for reading data from the environment, the hand held reader comprising a housing comprising an aperture, an environmentally responsive device supportably connected to the housing in a manner exposing a sensing portion to the environment proximate the aperture, the sensing portion providing an environmental reading for the environment, an interface bus communicatively coupled to the sensing portion, a central processing unit coupled to the interface bus, the central processing unit providing a signal for capturing the environmental reading from the sensing portion, an encoded information reader unit coupled to the central processing unit, the encoded information reader unit comprising a data collection hardware device selected from one of a bar code reading device, an RFID reading device, and a card reading device, a memory for storing the environmental reading and data from the data collection hardware device.

In still another embodiment, a data collection system for a portable data terminal having a housing with a form factor in surrounding relation to components of the portable data terminal, the data collection system comprising an interface bus comprising a two-wire interface, a temperature sensor coupled to the two-wire interface, the temperature sensor comprising a sensing portion exposed in a manner providing a temperature reading of an environment external to the housing, a memory for storing the temperature reading, and an encoded information reader unit in communication with the memory, the encoded information reader unit comprising a data collection hardware device selected from one of a bar code reading device, an RFID reading device, and a card reading device, wherein the portable data terminal is operative in a first sensing mode that correlates data from the data collection hardware device, and the temperature reading in response to an operator initiated signal.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention.

Thus, for further understanding of the concepts of the invention, reference can be made to the following detailed description, read in connection with the drawings in which.

DETAILED DESCRIPTION OF THE INVENTION

Figure 1:
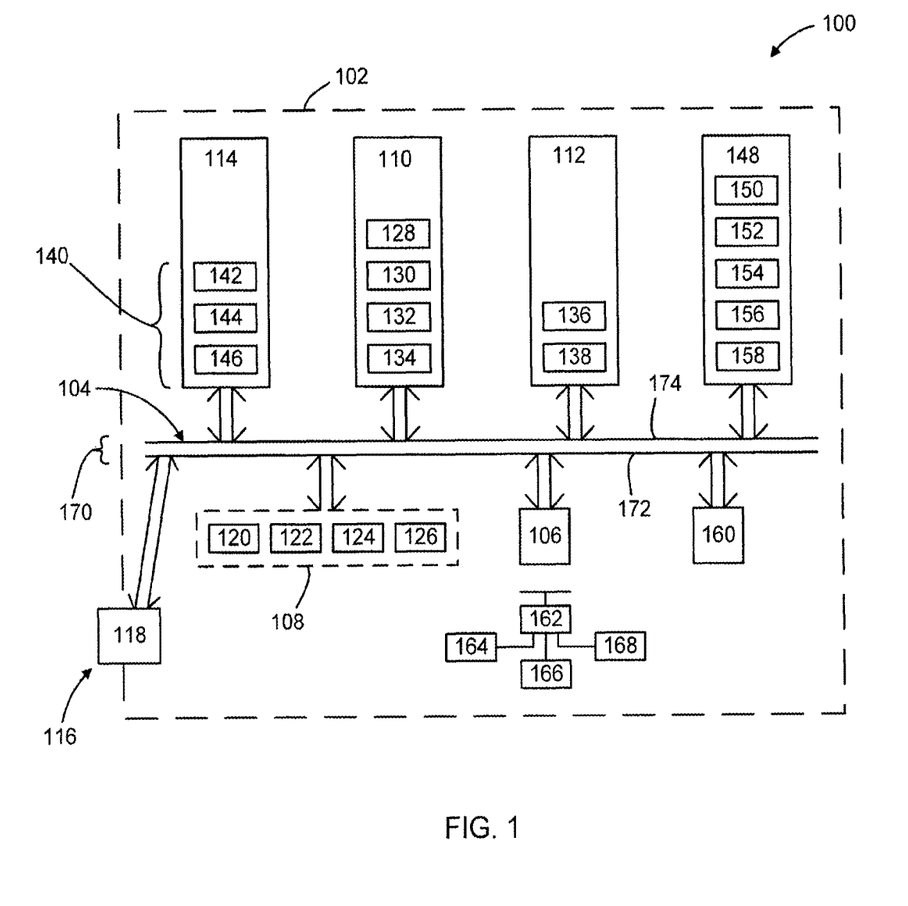
FIG. 1 is a schematic diagram of one example of a portable data terminal that is made in accordance with concepts of the present invention.
Figure 2:
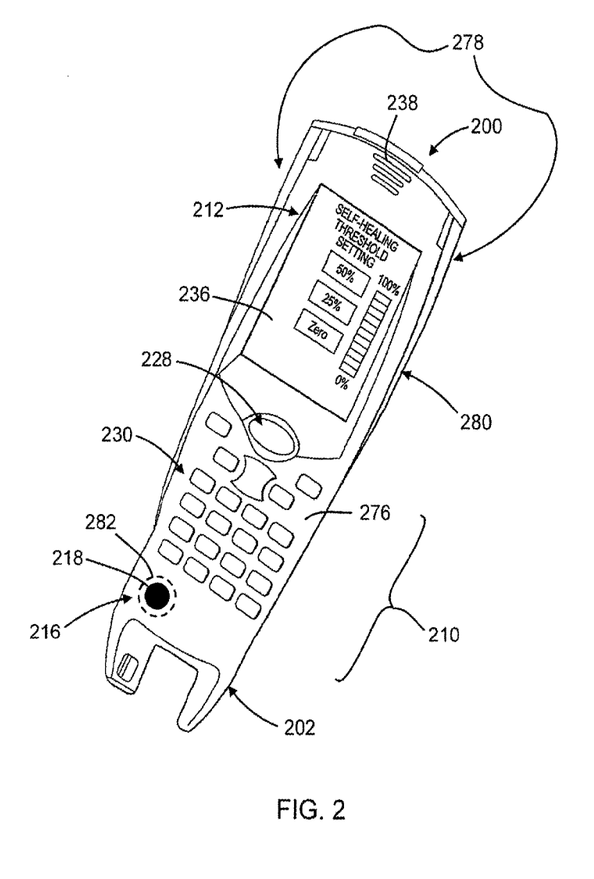
FIG. 2 is a perspective view of another example of a portable data terminal that is made in accordance with concepts of the present invention.
Figure 3:
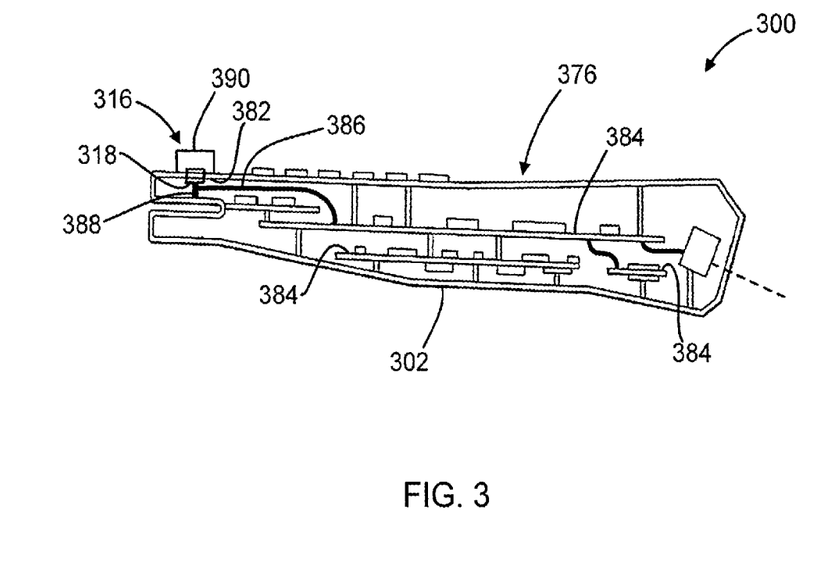
FIG. 3 is a section view of still another example of a portable data terminal that is made in accordance with concepts of the present invention.

With reference to the drawings, in general, and FIGS. 1-3 in particular, there is provided a portable data terminal and implementation thereof, embodiments of which are useful to collect data and information about the environment in surrounding relation to the device, and to correlate that environmental data with other data, e.g., image data, audio data and data stored in decodable indicia, which are encoded, decoded, and otherwise captured by the portable data terminal. Devices of the type disclosed and described herein are particularly configured so as to interface with the surrounding environment, thus providing a point of access in which to gather the environmental data, e.g., temperature data, humidity data, barometer data, and dew point data. This data is stored in memory so that it is available for further processing, such as, for example, for displaying on a display, performing calculations, graphing, and transmitting, among many other processing paradigms. Such functionality is often included in embodiments of the portable data terminal because these devices are generally equipped with electrical components that are operatively configured for, e.g., imaging, bar code scanning, picture taking, and card reading.

For example, and as will be discussed in more detail below, portable data terminals of the type contemplated herein may include electrical components arranged as integrated circuitry. A portion of which can be located substantially internal to the housing, enclosure, or casement of the device. This internal circuitry may include, but is not limited to, processors, volatile memory, and non-volatile memory, all of which can communicate via one or more integrated busses. All of these elements are integrated together to instantiate system architecture (often imprinted on, and/or connected to a printed circuit board), which is designed to execute instructions, algorithms, and logical operations that instruct the overall functionality of the portable data terminal devices, and in particular embodiments of the data terminal, the functions discussed immediately above.

The methods, instructions, algorithms, and logic operations that are here, and generally conceived to be a sequence of steps or actions leading to a desired result and may be implemented, or enabled by software, and firmware. While it may prove convenient to discuss such software as if it were embodied in a single program, most implementations will distribute the described functions among discrete (and some not so discrete) pieces of software. These pieces are often described using such terms as "programs," "objects," "functions," "subroutines," "libraries," ".dlls," "APIs," and procedures." One or more of these may find favor in the present description, although there is not intention to limit the invention or the described embodiments to the recited configurations.

For example, software for use in embodiments of the portable data terminal can include an operating system, such as, but not limited to, WINDOWS CE, WINDOWS MOBIL, WINDOWS XP, LINUX, PALM, SYMBIAN, OSX, and their various versions, improvements, and revisions. Likewise the software and the firmware can include applications, and drivers that have executable instructions compatible with the operating system, and particularly written so that, when executed, the terminal operates in a certain operating mode, or with certain functionality.

With respect to the software described herein, those having ordinary skill in the art will recognize that there exist a variety of platforms and languages for creating software for performing methods outlined herein. Embodiments of the present invention can be implemented using MICROSOFT VISUAL STUDIO, or any number of varieties of C. The choice of the exact platform and language is often dictated by the specifics of the actual system constructed, such that what may work for one type of system may not be efficient on another system. It is also note that the methods disclosed and contemplated herein are not limited to being executed as software on a processor or digital signal processor ("DSP"), but can also be implemented in a hardware processor such as would be implemented with hardware design language ("HDL") in an application specific integrated circuit ("ASIC").

By way of non-limiting example, it is seen in FIG. 1 that a high-level, schematic diagram of an example of a portable data terminal 100 is illustrated. Here, it is seen that the portable data terminal 100 can include a housing 102 that encapsulates in surrounding relation an interface bus 104, a control circuit 106 such as may be provided by central processing unit ("CPU") like a microprocessor integrated circuit chip, a memory 108, a user input interface 110, a user output interface 112, and an encoded information reader unit 114. The portable data terminal 100 can also include an environmentally responsive device 116 that has a sensing portion 118, which as mentioned above is positioned relative to the housing 102 so as to capture environmental data for the environment exterior to the housing 102 of the portable data terminal 100.

The CPU 106 receives data from and outputs data to other sub-systems for storage, transmission, and additional processing. In the present example, the CPU 106 is implemented using any number of off the shelf solutions. These include, but are not limited to, embedded processors, general purpose processors, or any number of custom solutions including pre-configured field programmable gate arrays ("FPGAs"), and ASICs.

The memory 108 can include a read only memory device ("ROM") 120, and a random access memory device ("RAM") 122. ROM 118 can be, e.g., an EROM or an EPROM. The memory 108 can also include a storage memory 124 such as a hard drive, and a flash memory device 126, which may be integrated into the portable data terminal 100 as it is illustrated in FIG. 1, or in other embodiments it may be a type of replaceable, removable memory device such as a flash memory card, a USB memory device, and the like.

Preferably, but not necessarily, the memory 108 can retain numerous types of files, including, but not limited to, the operating system files, the application files, the driver files, and configuration files for configuring the portable data terminal 100. Typically ones of the configurations files have executable instructions that are directed to particular hardware, integrated circuitry, and/or components of the portable data terminal 100. These include, for example, radio transceiver devices, card reader devices, and bar code reader devices, examples of which are discussed in more detail below. In one embodiment, the configuration files can be retrieved from the portable data terminal 100 by a host computer (not shown) that communicates with the terminal 100 via a docking station (not shown), or remotely via wireless communication technology. While not necessary to the general construction and operation of devices of the type consistent with the embodiments of the portable data terminal 100, the host computer is useful to modify, update, and otherwise change the configuration of the portable data terminal 100. For example, it may be useful to retrieve certain ones of the configuration files from the terminal 100, edit the files at the host computer, and then transfer the edited files back to the terminal 100.

The user input interface 110 can include a pointer controller 128, a keyboard 130, a touch panel 132, and a trigger 134. Exemplary devices that can be used for devices of the user input interface 110 are generally discussed immediately below. Each of these is implemented as part of, and often integrated into the housing 102 so as to permit an operator to input one or more operator initiated commands. These commands may specify, and/or activate certain functions of the portable data terminal 100. They may also initiate certain ones of the applications, drivers, and other executable instructions so as to cause the portable data terminal 100 to operate in an operating mode.

Devices that are used for the point controller 128 are generally configured so as to translate the operator initiated command into motion of a virtual pointer provided by a graphical user interface ("GUI") of the operating system of the portable terminal 100. It can include devices such as a thumbwheel, a roller ball, and a touch pad. In some other configurations, the devices may also include a mouse, or other auxiliary device that is connected, e.g., via wire, or wireless communication technology, to the portable data terminal 100.

Implementation of the keyboard 130 can be provided using one or more buttons, which are presented to the operator on the housing 102. The touch panel 132 may supplement, or replace the buttons of the keyboard 130. For example, one of the GUIs of the operating system may be configured to provide one or more virtual icons for display on, e.g., a display 136, or as part of another display device on, or connected to the portable data terminal 100. Such virtual icons (e.g., buttons, and slide bars) are configured so that the operator can select them, e.g., by pressing or selecting the virtual icon with a stylus (not shown) or a finger (not shown).

The virtual icons can also be used to implement the trigger 134. On the other hand, other devices for use as the trigger 134 may be supported within, or as part of the housing 102. These include, but are not limited to, a button, a switch, or a similar type of actionable hardware that can be incorporated into the embodiments of the portable data terminal 100. These can be used to activate one or more of the devices of the portable data terminal, such as the bar code reader discussed below.

The user output interface 112 can include the display 136, and an audio device 138. Displays of the type suited for use on the portable data terminal 100 are generally configured to display images, data, and GUIs associated with the operating system and/or software (and related applications) of the portable data terminal 100. The displays can include, but are not limited to, LCD displays, plasma displays, LED displays, among many others and combinations thereof. Although preferred construction of the portable data terminal 100 will include devices that display data (e.g., images, and text) in color, the display that is selected for the display 136 may also display this data in monochrome (e.g., black and white). It may also be desirable that the display 136 is configured to display the GUI, and in particular configurations of the portable data terminal 100 that display 136 may have an associated interactive overlay, like a touch screen overlay. This permits the display 136 to be used as part the GUI so as to permit the operator to interact with the virtual icons, the buttons, and other implements of the GUI to initiate the operator initiated commands, e.g., by pressing on the display 136 with the stylus (not shown) or finger (not shown).

The audio device 138 permits the portable data terminal 100 be used to gather, receive, transmit, and convey acoustic signals, e.g., voice, audio, and sounds. Although not provided explicitly in the figures illustrated and described herein, the audio device 138 may include receiving and conveying portions. For example, the receiving and conveying portions may be similar to, respectively, a microphone and a speaker found on telephonic devices, e.g., cellular telephones.

The housing 102 can be constructed so that it has a form, or "form factor" that can accommodate some, or all of the hardware and devices mentioned above, and discussed below. The form factor defines the overall configuration of the housing 102. Suitable form factors that can be used for the housing 102 include, but are not limited to, cell phones, mobile telephones, personal digital assistants ("PDA"), as well as other form factors that are sized and shaped to be held, cradled, and supported by the operator, e.g., in the operator's hand(s). One exemplary form factor is illustrated in the embodiment of the portable data terminal 200 discussed in connection with FIG. 2 below.

The encoded information reader unit 114 can include data collection hardware 140, which can include, but is not limited to, one or more of a bar code reader device 142, an RFID reader device 144, and a card reader device 146. The bar code reader device 142 may be provided by, e.g., an IT4XX/5XX Imaging Module of the type available from Hand Held Products, Inc. of Skaneateles Falls, N.Y. The IT4XX/5XX Imaging Module is configured with integrated circuitry to capture image data, which can be translated into visual image data by compatible circuitry and processors contemplated herein. The IT4XX/5XX Imaging Module is also configured with decode out circuitry that provides decoding of a plurality of different types of bar code symbols and other decodable symbols such as PDF 417, Micro PDF 417, Maxicode, Data Matrix, QR Code, Aztec, Aztec Mesa, Code 49, UCC Composite, Snowflake, Data Gliffs, Code 39, Code 128, Codabar, UPC, EAN, Interleave 205, RSS, Code 93, Codablock, BC412, Postnet, Planet Code, BPO Forcedate, Canadian Forcedate, Japanese Post, KIX (Dutch Post), OCR A and OCR B.

The RFID reader device 144 is of the type that can wirelessly interact with RFID transponders, and RFID tags that are compatible with the selected reader device. Exemplary ones of the RFID transponders, and RFID tag, can communicate with the RFID reader device 144 as a passive device (limited functionality), and active device (broader functionality). They are generally recognized, and so their functionality is not discussed in detail herein. An example of a suitable device for use as the RFID reader device 144 is provided by a Skyetek SkyeModule series reader and card reader from SkyeTek of Westminster, Colo.

Suitable card reader devices of type used as the card reader 146 can have reading and/or writing functionality. This includes, for example, devices compatible with information retrieved from (or encoded in) financial transaction cards, e.g., credit cards, debit cards, gift cards, electronic benefit cards, customer loyalty cards, and the like. It also includes other cards, like, for example, integrated circuit cards that are used as "tokens" for security applications, or as a tool for use in reconfiguring the data collection tool 100. Other suitable devices for the card reader 146 may include an integrated circuit card (IC CARD) reader device (not shown), otherwise known as a smart card reader device.

In one embodiment, the portable data terminal 100 may also include a radio communication interface device unit 148. This may include one or more radio transceiver devices 150, such as an IEEE 802.11 radio transceiver device 152, a Bluetooth radio transceiver device 154, a WIMAX radio transceiver device 156, and a cellular radio transceiver device 158 compatible with, e.g., GSM and CDMA protocols. Other examples of devices include, for example, global positioning system ("GPS") devices, and similar devices that can provide geo-positional, positional, and location information.

Still other embodiments of the portable data terminal 100 may include a serial input/output interface 160, and a power distribution circuit 162 that receives power from a variety of different power sources including a serial power source 164 (e.g., a USB cable), an AC/DC power supply 166, and a rechargeable battery 168.

An example of the interface bus 104 is a two-wire interface 170 that supports and which can transmit commands to a plurality of integrated circuits, e.g., the environmentally responsive device 116. Each of the integrated circuits can be assigned a different two-wire interface address so that commands and/or parameter data that is intended for a specific integrated circuit can be sent to that specified integrated circuit. These commands may originate from the operator as the operator initiated command, mentioned above, and also internally as commands and instructions that are part of, and/or incorporated into the firmware, software, and other executable instructions of the portable data terminal 100.

In the present example, the two-wire interface 170 includes a signal line 172, or SDA line, and a clocking signal line 174, or SCL line. Each of which are used, respectively, to transmit data (via signal line 172) and to transmit a clock signal (via the clocking signal line 174). In one example, each of the signal line 172 and the clocking signal line 174 are configured in accordance with a PHILLIPS I$^2$C bus. While the details of the I$^2$C bus will not be discussed in detail herein, it is contemplated that in the interface bus 104 of the present example, the signal line 172 can carry address information commands, such as, for example, read and write commands to addressable registers that are internal to I$^2$C compatible hardware.

Exemplary devices that are used for the environmentally responsive device 116 are responsive to one or more environmental factors, such as, for example, temperature, humidity, barometric pressure, and other factors typical of the environment about the housing 102 of the portable data terminal 100. The type and configuration of the environmentally responsive device 116 may be selected so that it can be coupled to the interface bus 104. Generally such devices can be incorporated with the housing 102, as, for example, an integral (and/or monolithic) part of the housing 102.

In other embodiments of the portable data terminal 100, it is also contemplated that the housing 102 can include a port, and/or a connector (hereinafter, "a serial bus connector") that is included with the housing 102, incorporated into the housing 102, or otherwise disposed on the housing 102 so as to provide a removable, detachable interface that can receive the environmentally responsive device 116. This can include, for example, modules that include all or part of the device 116, which can be interchanged onto the device so as to provide one or more of the functional responses to the environmental factors discussed immediately above. In one example, the bus serial bus connector is coupled to the interface bus 104 (e.g., via cabling, and wiring) so as to permit the interchangeable module to communicate with the interface bus 104.

Certain ones of the device 116 that are used may be compatible with the two-wire interface 170, and in one construction of the portable data terminal 100 the device 116 is compatible with the PHILLIPS I$^2$C bus. In one embodiment of the portable data terminal 100, the sensing device 118 is a temperature sensing device, which measures the temperature of the environment around the portable data terminal 100. An example of a temperature sensing device is the TI TMP75 Digital Temperature Sensor with Two-Wire Interface, manufactured and sold by Texas Instruments Incorporated of Dallas, Tex.

In view of the foregoing, various embodiments of the portable data terminal 100 may be a hand held device, such as data terminal 100, PDAs, or other platform that have data collection hardware 140 with capabilities to capture and read images, some of which may have decodable indicia provided therein. PDAs are typically defined as hand held devices (or readers) that are used as a personal organizer, having many uses such as reading information bearing the indicia, calculating, use as a clock and calendar, playing computer games, accessing the Internet, sending and receiving electronic messages, facilitating telephonic voice communications, use as a radio or stereo, video recording, recording notes, use as an address book, and use as a spreadsheet. A plurality of buttons and keys may be used to control the operation of the PDA. This includes the buttons discussed in connection with the keyboard 130, and the display 136, as well as other buttons not necessarily discussed, but that are consistent with the functions, the capabilities, the control, and the operation of the portable data terminal 100 overall, and the data collection hardware 140 in particular.

The portable data terminal 100, like the PDA, may be equipped with the ability to query and receive and transmit data, such as firmware via a communication link. This may be done by radio link or wired link. Upgrading firmware from a host, e.g., the host computer described above, to the PDA (also referred to as uploading or pushing) and duplicating configuration parameters may be performed by reading specific decodable indicia to ensure that the portable data terminal 100 is operating at the proper revision and have the proper configuration parameters.

FIG. 2 illustrates a perspective view of an example of a portable data terminal 200 that is constructed in accordance with concepts of the present invention. Here, like numerals are used to indicate like components of FIG. 1, except these numerals have been increased by 100. Moreover, because the example that is illustrated has a fully integrated housing 202, some of the features of the internal circuitry discussed in connection with FIG. 1 have been removed for clarity. In this connection, it is seen that in addition to the housing 202, the portable data terminal 200 can include a user input interface 210 with a pointer controller 228, and a keyboard 230, a user output interface 212 that has a display 236 and an audio device 238, and an environmentally responsive device 216 with a sensing portion 218.

It is also seen that the housing 202 can include a front surface 276, side surfaces 278, and a back surface 280, which is located on the side of the housing 202 that is opposite the front surface 276. The front surface 276 has an aperture 282 where the sensing portion 218 is positioned so as to have access to the environment surrounding the housing 202. This is, however, only one exemplary configuration of the location of the aperture 282. It can be located in different locations in other embodiments of the portable data terminal 200. That is, the aperture 282 can be located anywhere on the housing 202 in order to accommodate the sensing portion 218, and to provide suitable access for the sensing portion 218 so that it can capture the environmental data from the environment.

More particularly, and with reference now to the section view of the example of a portable data terminal 300 that is illustrated in FIG. 3, it is seen that the portable data terminal 300 has a housing 302 that incorporates an environmentally responsive device 316 with a sensing portion 318, where the housing 302 has a front surface 376 with an aperture 382 that is sized and configured to receive the sensing portion 318. The portable data terminal 300 also includes circuit boards 384, and a cable 386 that couples the sensing device 316 to the circuit boards 384. The portable data terminal 300 further includes a mechanical interface 388, and a protective cap 390 that is disposed over the sensing portion 318 in the present example of the portable data terminal 300.

The circuit boards 384 are generally constructed as printed circuit boards that include one or more of the devices, components, and assemblies discussed in connection with the embodiment illustrated in FIG. 1. That is, the integrated circuitry and other architecture that is needed to permit the portable data terminal 300 to perform its various functions is constructed as part of one or more of the circuit boards 384. This include the interface bus 104 (FIG. 1), and more particularly the two-wire interface 170 (FIG. 1).

The cable 386 is likewise configured to permit communication of the sensing portion 318 with the circuit boards 384 so that the portable data terminal 300 can collect the environmental data. Typical cables that are used as the cable 386 are constructed so that they can couple the environmentally responsive device 316 to the interface bus 104 (FIG. 1). For example, when coupling with the two-wire interface 170 (FIG. 1), the cable 386 may include a data line (not shown) and a clock line (not shown). These connect, respectively, to the signal line 172 (FIG. 1) and the clocking signal line 174 (FIG. 1) of the two wire interface 170 (FIG. 1). The cable 386 can also include other lines, e.g., power lines, and ground lines, that are selected based on, for example, the type of sensing apparatus that is used at the sensing portion 318 of the environmentally responsive device 316.

By way of non-limiting example, and as it is illustrated in FIG. 3, the aperture 382, the mechanical interface 388, and the protective cap 390 are configured in a manner that permits the sensing portion 318 to be exposed to the environment surrounding the housing 302. For example, the mechanical interface 388 positions the sensing portion 318 relative to the aperture 382 so that the sensing portion 318 extends out of the housing 302. Exemplary mechanical interfaces can include multiple pieced assembles with portions that can receive and secure the sensing portion 318 such as, for example, via mechanical fasteners, adhesives, and snap-type fittings. These may be incorporated integrally as part of the housing 302, or as separate pieces parts that are assembled and attached to the housing 302.

The protective cap 390 is typically configured to protect the sensing portion 318, as well as to seal the open portion of the housing 302 at the aperture 382. It may be desirable that it is constructed of materials that are resistant to damage, such as may occur by dropping, crushing, or attempting to puncture the protective cap 390. Preferably, the materials of construction are also selected so as to promote, or facilitate the data collection that occurs via the sensing portion 318. For example, if the sensing portion is designed to sense temperature of the environment, then the material for the protective cap 390 may have certain thermal properties that are conducive to transferring thermal energy from the environment to the sensing portion 318.

As discussed above, the embodiments of the portable data terminals 100, 200, 300 are operative in a plurality of operating modes, which can be activated by the operator via the operator initiated instruction. Generally the operating modes comprise modes that capture environmental data, and information from the data collection hardware, as well as other data and information, e.g., time, date, and location. For example, the operating modes may include a mode for collecting environmental data, and storing the environmental data in the memory in response to the decoding of the decodable indicia. Decoding is a term used to describe the interpretation of the decodable indicia by, e.g., the bar code reader. Information respecting the various reference decode algorithms is available from various publication standards, such as by the International Organization ("ISO").

The operating modes may also include a mode for collecting environmental data where the environmental data is captured at one or more configurable time periods, with or without being initiated by the operator initiated command. This measured data may be stored in memory. It can also be retrieved from the memory so that it can be displayed on the display as a graph, in a spreadsheet, or other display method consistent with the concepts disclosed herein. In one embodiment of the portable data terminal 100, the operating modes include a mode where the environmental data is measured continuously such as, for example, when the configurable time period is substantially zero. Here, the measured data can be stored in memory, and/or displayed on the display of the portable data terminal as a part of, or incorporated into one of the GUIs of the operating system.

Still another operating mode may permit the portable data terminal to correlate the environmental data with the information that is decoded from the decodable indicia. For example, and discussing an implementation of the portable data terminal in, e.g., a warehousing environment, a operator initiate scanning of a bar code of a product via the operator initiated command (e.g., by pressing a button), and record data about the environment in the warehouse at a time contemporaneously with bar code scan. The portable data terminal can store the information from the bar code, the environmental data in a file in the memory. This file may have both the information and the environmental data in e.g., a correlated format. In some embodiments, the information from the bar code, and the environmental data may be stored in separate files, with the portable data terminal being operatively configured to access, and correlate, the information and the environmental data from the separate files. In still other embodiments, the portable data terminal may also record the time of the scan, the location of the scan (e.g., via GPS), and store this additional information along with, and/or correlated to, the bar code and environmental data. Examples of other operating modes and functionality as it relates to the environmentally responsive device are further disclosed in U.S. Patent Application Publication No. 2008/0185432, filed as U.S. patent application Ser. No. 11/669,987, on Feb. 1, 2007 by Caballero et al., and assigned to Hand Held Products, Inc. U.S. Patent Application Publication No. 2008/0185432 is incorporated herein by reference in its entirety.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

The invention claimed is:

1. A device, comprising:
a housing;
a sensor connected to the housing in a manner exposing the sensor to an environment, wherein the sensor provides an environmental reading for the environment;
an encoded information reader unit configured to scan decodable indicia and to output decoded data from decodable indicia;
a location data providing unit configured to output location data; and
a memory;
wherein the device operates in a plurality of modes comprising a first operating mode in which the device captures the environmental data at a first configurable time and a second configurable time that is different from the first configurable time; and
wherein the device is configured, in the first operating mode, to collect environmental data from the sensor and location data from the location data providing unit, and to store the environmental data and the location data in the memory in response to decoding decodable indicia, the decoded data and the environmental data correlated to the location data.

2. The device of claim 1, wherein the device is configured, in the first operating mode, to output the location data at the first configurable time and the second configurable time.

3. The device of claim 2, wherein the first configurable time is separated from the second configurable time by a configurable time period.

4. The device of claim 3, wherein the plurality of modes comprises a second mode in which the device captures a plurality of environmental readings, wherein the environmental readings comprise a first environmental reading and a second environmental reading that occurs at the configurable time period, away from the first environmental reading.

5. The device of claim 1, wherein device stores the environmental data and decoded data in a common file in the memory.

6. The device of claim 1, wherein the encoded information reader unit comprises a bar code reader device.

7. The device of claim 1, wherein the location data providing unit comprises a global positioning system.

8. A device, comprising:
a housing;
a sensor connected to the housing in a manner exposing the sensor to an environment, wherein the sensor provides an environmental reading for the environment;
a location data providing unit configured to output location data; and
an audio device for receiving acoustic signals and generating audio data; and a memory;
wherein the device operates in a plurality of modes comprising a first operating mode in which the device captures the environmental data at a first configurable time and a second configurable time that is different from the first configurable time; and
wherein the device is configured, in the first operating mode, to collect environmental data from the sensor and location data from the location data providing unit, and to store the environmental data and the location data in the memory in response to generating audio data, the environmental data correlated to the location data.

9. The device of claim 8, wherein the audio device comprises a microphone for receiving acoustic signals.

10. The device of claim 8, wherein the audio device comprises a speaker for transmitting acoustic signals.

11. The device of claim 8, wherein the acoustic signals comprise voice, audio, and/or sounds.

12. The device of claim 8, wherein the device is configured, in the first operating mode, to output the location data at the first configurable time and the second configurable time.

13. The device of claim 12, wherein the first configurable time is separated from the second configurable time by a configurable time period.

14. The device of claim 13, wherein the plurality of modes comprises a second mode in which the device captures a plurality of environmental readings, wherein the environmental readings comprise a first environmental reading and a second environmental reading that occurs at the configurable time period away from the first environmental reading.

15. The device of claim 8, wherein device stores the environmental data and audio data in a common file in the memory.

16. The device of claim 8, wherein the sensor is operative to obtain environmental data comprising temperature data, humidity data, barometer data, and dew point data.

17. The device of claim 8, wherein the location data providing unit comprises a global positioning system.

18. A device, comprising:
a housing comprising a connector;
a module comprising a sensor connected to the housing via the connector in a manner exposing the sensor to an environment, wherein the sensor provides an environmental reading for the environment;
an encoded information reader unit configured to scan decodable indicia and to output decoded data from decodable indicia;
a location data providing unit configured to output location data; and
a memory;
wherein the connector comprises a removable, detachable interface for receiving the module;
wherein the device operates in a plurality of modes comprising a first operating mode in which the device captures the environmental data at a first configurable time and a second configurable time that is different from the first configurable time; and wherein the device is configured, in the first operating mode, to collect environmental data from the sensor and location data from the location data providing unit, and to store the environmental data and the location data in the memory in response to decoding a decodable indicia, the decoded data and the environmental data correlated to the location data.

19. The device of claim 18, wherein the device is configured, in the first operating mode, to output the location data at the first configurable time and the second configurable time.

20. The device of claim 19, wherein the first configurable time is separated from the second configurable time by a configurable time period.

21. The device of claim 18, wherein device stores the environmental data and decoded data in a common file in the memory.

22. The device of claim 18, wherein the sensor is operative to obtain environmental data comprising temperature data, humidity data, barometer data, and dew point data.

23. The device of claim 18, wherein the location data providing unit comprises a global positioning system.

* * * * *